June 26, 1962  D. S. COCHRAN  3,041,535
ELECTRICAL MEASURING INSTRUMENT
Filed Jan. 12, 1959
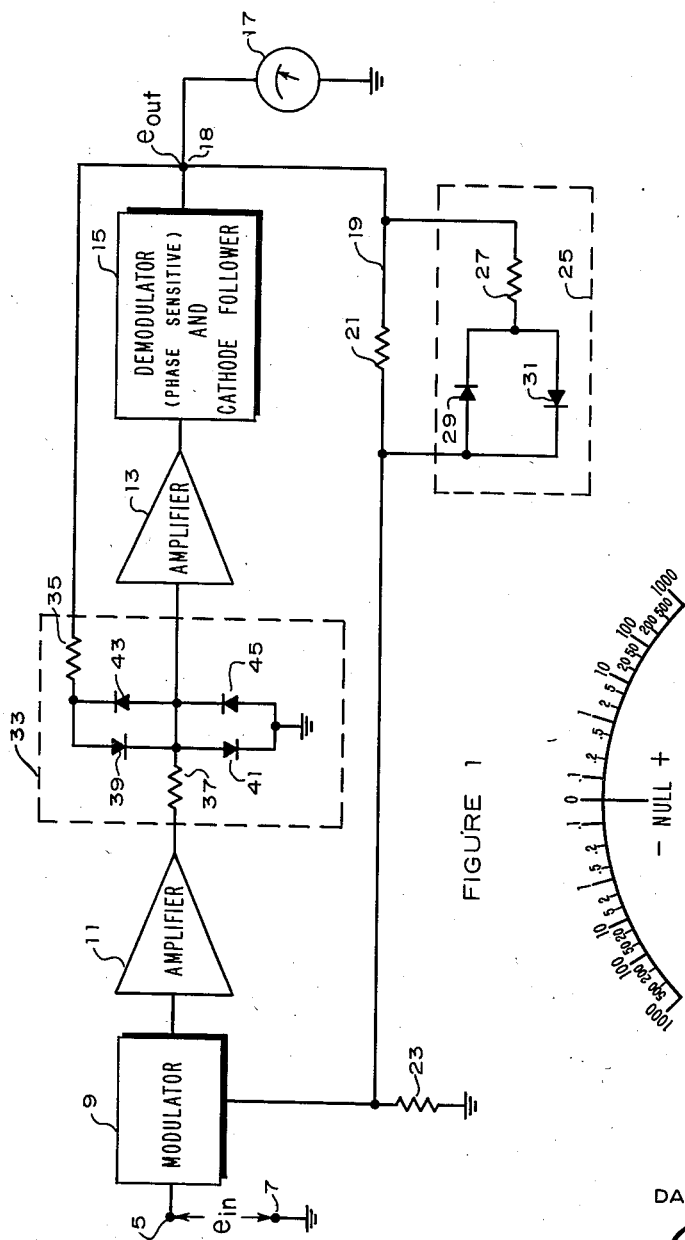
INVENTOR
DAVID S. COCHRAN
BY
ATTORNEY

3,041,535
ELECTRICAL MEASURING INSTRUMENT
David S. Cochran, Palo Alto, Calif., assignor to Hewlett-Packard Company, Palo Alto, Calif., a corporation of California
Filed Jan. 12, 1959, Ser. No. 786,180
4 Claims. (Cl. 324—118)

This invention relates to electrical measuring instruments, and more particularly to instruments designed to indicate accurately a null or zero quantity such as voltage. Instruments of this type, which will be referred to as "null indicators," are particularly useful in bridge measuring techniques.

Standard vacuum-type voltmeters are unsatisfactory as null indicators because they usually require a certain amount of switching from the high voltage ranges to the low voltage ranges as zero is approached. While null indicators should be accurate and sensitive when the measured voltage is in the vicinity of zero, the need for sensitivity and accuracy decreases as the measured voltage increases.

It is an object of this invention to eliminate range switching by providing an instrument having an input sensitivity which varies inversely with the deflection of the indicating meter.

It is another object of this invention to provide a single range instrument which is accurate, sensitive and linear in the vicinity of zero, and the sensitivity of which decreases substantially and rapidly as the measured quantity increases.

Other and incidental objects of this invention will be apparent from a reading of the following specification and an inspection of the accompanying drawing in which:

FIGURE 1 is a block and circuit diagram of a measuring instrument in accordance with this invention; and FIGURE 2 shows the meter scale of the measuring instrument of FIGURE 1.

Referring now to FIGURE 1 there are shown two input terminals 5 and 7 across which may be impressed a positive or negative D.-C. input voltage $e_{in}$. A modulator 9 changes the D.-C. input voltage into an A.-C. voltage which is amplified by the amplifiers 11 and 13. The amplifier A.-C. voltage is then fed to a stage 15 in which it is demodulated by a phase-sensitive detector, and passed through a cathode follower. The output D.-C. voltage $e_{out}$ of stage 15 is measured by means of the meter 17 which is connected between the output terminal 18 and ground. A closed negative feedback loop 19 comprising resistors 21 and 23 serves to stabilize the amplifiers 11 and 13. The system thus far described is shown in U.S. patent application Serial Number 643,782 filed March 4, 1957 by William R. Hewlett et al., now issued as U.S. Patent No. 3,014,135, and entitled Direct Current Amplifier and Modulation Therefor.

In accordance with this invention the attenuation in the feedback loop 19 is made to vary with the output voltage $e_{out}$ so that the amount of negative feedback increases as the output voltage increases; while the gain of the A.-C. amplifier is attenuated as the output voltage increases. In this manner the loop gain, i.e. the product of the forward gain by the feedback gain, remains constant.

The variation in the attenuation in the feedback loop 19 is accomplished by placing network 25 in parallel with the resistor 21. Network 25 comprises the resistor 27 and the two silicon diodes 29 and 31. Without the network 25, the amount of feedback is determined by the potential division across series resistors 21 and 23. Network 25 affects this potential division by providing, in shunt with resistor 21, a path the resistance of which varies with the output voltage $e_{out}$. This non-linear resistance path comprises resistor 27 and, depending on the polarity of the output voltage, one of the diodes 29 and 31. When the output voltage is between zero and approximately two-tenths of a volt, neither of the diodes 29 and 31 conduct so that the feedback is determined solely by the resistors 21 and 23 and remains linear with voltage. Above approximately two-tenths of a volt, one of the diodes 29 or 31 (depending on the polarity of the output voltage) starts conducting and its resistance decreases as the output voltage increases. This increases the negative feedback in loop 19 so that, as the output voltage increases, the amount of input voltage necessary to give a given deflection increment on the scale of meter 17 also increases.

The attenuation in the gain of the A.-C. amplifier is accomplished by means of the non-linear resistance network 33. Network 33 comprises resistors 35 and 37 and silicon diodes 39, 41, 43 and 45. When the output voltage is between zero and approximately two-tenths of a volt, none of diodes 39, 41, 43 and 45 conduct and there is no attenuation in the A.-C. amplifier. Diodes 39 and 43 act as isolating diodes: were they not present there would be some attenuation due to the voltage division over resistors 37, 35 and the path between output terminal 18 and ground. Above approximately two-tenths of a volt, one of the diode pairs 39, 41 or 43, 45 (depending on the polarity of the output voltage) starts conducting, and the input signal to amplifier 13 is attenuated over the voltage divider comprising resistance 37 and one of diodes 41 and 45. This attenuation increases as the output voltage increases, since the resistance of the diodes goes down with increasing output voltage.

Reference is now made to FIGURE 2 which shows a typical scale for the meter 17. It can be seen that the deflection between zero and two-tenths of a volt is very nearly linear, while above two-tenths of a volt the deflection goes down very rapidly with increased voltage.

I claim:
1. An instrument for measuring applied direct-current signals and comprising a modulator to produce an alternating current signal having an amplitude that is equal to the difference between a direct-current feedback signal and said applied direct-current signal, an alternating-current amplifier to amplify said alternating-current signal, a demodulator to demodulate this amplified alternating-current signal into an amplified direct-current signal, a meter to measure said amplified direct-current signal, a non-linear gain attenuator for said amplifier, a non-linear resistance element, means including said non-linear resistance element in a negative direct-current feedback path to apply said direct current feedback signal to the modulator from the output of the demodulator and a connection between the output of said demodulator and said non-linear gain attenuator, whereby both the direct-current negative feedback and the gain attenuator are controlled by the output of said demodulator in such a manner that both attenuation and feedback increase as the output of said demodulator increases.

2. An instrument for measuring applied direct-current signals and comprising a modulator to produce an alternating current signal having an amplitude that is equal to the difference between a direct current feedback signal and said applied direct current signal, an alternating-current amplifier to amplify said alternating-current signal, a demodulator to demodulate this amplified alternating-current signal into an amplified direct-current signal, a meter to measure said amplified direct-current signal, a non-linear gain attenuator for said amplifier, a potential divider having two series-connected resistors and a non-linear resistance element in parallel with one of said resistors, means including said potential divider in a negative direct-current feedback path to apply said direct current feedback signal to the modulator from the output of the demodulator and a connection between the output of said demodulator and said non-linear gain attenuator, whereby both the direct-current negative feedback and the gain attenuator are controlled by the output of said demodulator in such a manner that both attenuation and feedback increase as the output of said demodulator increases.

3. An instrument for measuring applied direct-current signals and comprising a modulator to produce an alternating current signal having an amplitude that is equal to the difference between a direct current feedback signal and said applied direct current signal, an alternating-current amplifier to amplify said alternating-current signal, a demodulator to demodulate this amplified alternating-current signal into an amplified direct-current signal, a meter to measure said amplified direct-current signal, a non-linear gain attenuator for said amplifier, a potential divider having two series-connected resistors and at least one diode in parallel with one of said resistors, means including said potential divider in a negative direct-current feedback path to apply said direct current feedback signal to the modulator from the output of the demodulator and a connection between the output of said demodulator and said non-linear gain attenuator, whereby both the direct-current negative feedback and the gain attenuator are controlled by the output of said demodulator in such a manner that both attenuation and feedback increase as the output of said demodulator increases.

4. An instrument for measuring applied direct-current signals and comprising a modulator to produce an alternating current signal having an amplitude that is equal to the difference between a direct current feedback signal and said applied direct current signal, an alternating-current amplifier to amplify said alternating-current signal, a demodulator to demodulate this amplified alternating-current signal into an amplified direct-current signal, a meter to measure said amplified direct-current signal, a non-linear gain attenuator for said amplifier, a potential divider having two series-connected resistors and two diodes in parallel with one of said resistors, said diodes being connected in parallel with each other in opposing polarities, means including said potential divider in a negative direct-current feedback path to apply said direct current feedback signal to the modulator from the output of the demodulator and a connection between the output of said demodulator and said non-linear gain attenuator, whereby both the direct-current negative feedback and the gain attenuator are controlled by the output of said demodulator in such a manner that both attenuation and feedback increase as the output of said demodulator increases.

References Cited in the file of this patent

UNITED STATES PATENTS

| | | |
|---|---|---|
| 2,459,730 | Williams | Jan. 18, 1949 |
| 2,824,286 | Burt | Feb. 18, 1958 |
| 2,856,468 | Berry | Oct. 14, 1958 |

FOREIGN PATENTS

| | | |
|---|---|---|
| 525,690 | Great Britain | Sept. 3, 1940 |

UNITED STATES PATENT OFFICE
CERTIFICATE OF CORRECTION

Patent No. 3,041,535                                    June 26, 1962

David S. Cochran

It is hereby certified that error appears in the above numbered patent requiring correction and that the said Letters Patent should read as corrected below.

Column 2, line 52, column 3, lines 2, 23 and 24, and column 4, line 15, after "demodulator", each occurrence, insert a comma.

Signed and sealed this 23rd day of October 1962.

(SEAL)
Attest:

ERNEST W. SWIDER                                    DAVID L. LADD
Attesting Officer                                       Commissioner of Patents